United States Patent [19]

Janusz

[11] Patent Number: 4,690,712
[45] Date of Patent: Sep. 1, 1987

[54] POLYAMIDE-MODIFIED METAL RESINATES AND THEIR USE IN PUBLICATION GRAVURE PRINTING INKS

[75] Inventor: Edward G. Janusz, Wallington, N.J.

[73] Assignee: Sun Chemical Corporation, New York, N.Y.

[21] Appl. No.: 718,530

[22] Filed: Apr. 1, 1985

[51] Int. Cl.$^4$ .............................................. C09D 11/08
[52] U.S. Cl. .................................... 106/30; 525/54.42; 527/600
[58] Field of Search ................... 106/30, 20; 525/54.4, 525/54.42; 527/600

[56] References Cited

U.S. PATENT DOCUMENTS 3,296,001  1/1967  Ambler ............................... 106/309
3,962,397  6/1976  Narui et al. ......................... 427/106

Primary Examiner—Amelia B. Yarbrough
Attorney, Agent, or Firm—Cynthia Berlow; Mitchell D. Bittman

[57] ABSTRACT

The product of the reaction of a metal resinate and an amine-reactive polyamide is useful as the vehicle of publication gravure printing inks, resulting in prints that have superior properties such as holdout, gloss, and color developement.

6 Claims, No Drawings

POLYAMIDE-MODIFIED METAL RESINATES AND THEIR USE IN PUBLICATION GRAVURE PRINTING INKS

This invention relates to printing inks. More particularly it relates to publication gravure printing inks.

BACKGROUND OF THE INVENTION

Inks conventionally used for the gravure printing of magazines, inserts, newspapers, and the like comprise a pigment, a solvent, and a metal resinate. These inks are deficient in gloss and holdout, particularly on poor quality uncoated stock.

SUMMARY OF THE INVENTION

It has now been found that the printability on low quality paper stock and gloss on coated paper stock can be improved with inks prepared with polyamide-modified metal resinate vehicles.

DETAILED DESCRIPTION OF THE INVENTION

The polyamide-modified metal resinate products that are used as vehicles in publication gravure printing inks are prepared by reacting a metal resinate with a polyamide in solution at an elevated temperature.

Suitable metal resinates include, but are not limited to, calcium, zinc, and magnesium salts, either alone or in combination with rosin, dimerized rosin, polymerized rosin, maleated rosin, phenolated rosin, and the like, and their mixtures. Tall oil, gum rosin, or wood rosin can also be used in combination with the metal resinate.

Amine-reactive polyamides that can be used to modify the metal resinate include, but are not limited to, reaction products of dimerized fatty acids; trimerized fatty acids: $C_2-C_{20}$ monobasic acids; diamines such as ethylene diamine, hexamethylene diamine, and neopentyl diamine; polyamines such as diethylene triamine and triethylene tetramine; and the like, and their mixtures.

The reaction is essentially the amine-salt formation of the amino groups of the polyamide and the carboxyl groups of the metal resinate. The two ingredients are generally reacted in the ratio of about 1-5 equivalents of the metal resinate to 1 equivalent of the polyamide, and preferably the ratio is 2 carboxyl equivalents to 1 amine equivalent.

The reaction temperature is generally about 25° to 100° C. and preferably about 70° to 90° C.

Solvents suitable for use in the reaction include toluene, Lactol Spirits (a mixture of heptane and toluene). Rotosolve (a mixture of aliphatic and aromatic hydrocarbons), and the like, and mixtures thereof.

These polyamide-modified metal resinates have a higher viscosity than the unmodified metal resinates, enabling them to be used with low-cost solvents. Inks formulated with these products as the vehicles have improved holdout (non-penetration) properties on low quality porous paper stock.

The invention will be illustrated by the following examples in which all parts and percentages are by weight unless otherwise specified.

EXAMPLE 1

(A) 500 Parts (0.345 equivalent) of a solution of a calcium-zinc resinate in toluene containing 60% of non-volatile material, 375 parts of toluene, and 202.5 parts of Lactol Spirits were charged into a two-liter round bottom flask equipped with stirrer, thermometer, and water-cooled condenser and stirred at room temperature.

75 Parts (0.1725 equivalent) of a 60% non-volatile solution in toluene of a polyamide based on dimerized fatty acids, tall oil fatty acid, and diethylene triamine and having an amine value of 238 was added. The mixture was stirred, heated to 80° C., and the temperature held at 80° C. ±5° C. for one hour. The mixture was then discharged.

The product had a Gardner-Holdt viscosity @25° C. of Z4-5, a Gardner color @25° C. of 12, and contained 30% of non-volatile material.

(B) A publication gravure ink was made by the following procedure:

45 Parts of a blue pigment base was admixed at room temperature with 55 parts of the product of part (A) and agitated until uniform. The viscous ink product was then reduced with 40/60 toluene/Lactol spirits to print viscosity (18 seconds #2 steel cup).

(C) The resulting blue ink was used to print insert stock. The quality of the print was excellent and superior to a print made with a conventional ink in both holdout and gloss.

EXAMPLE 2

The procedure of Example 1 was repeated except that the following ingredients were used: 500 parts (0.345 equivalent) of a solution of a calcium-zinc-magnesium resinate in 40/60 toluene/Lactol Spirits; 121 parts (0.275 equivalent) of a 55% solids solution in toluene of a polyamide prepared from dimerized fatty acids, soya fatty acid, and diethylene triamine having an amine value of 340; 500 parts of toluene; and 310 parts of Lactol Spirits. The product had a Gardner-Holdt viscosity @25° C. of Z4, a Gardner color @25° C. of 12, and contained 25% of non-volatile material.

As in Example 1, a publication gravure printing ink was formulated and used to print supplement stock. The results were comparable, that is, the print had excellent holdout and gloss.

EXAMPLE 3

The procedure of Example 1 was repeated with each of the following metal resinates instead of calcium-zinc resinate: calcium resinate and magnesium resinate. The results were comparable.

EXAMPLE 4

The procedure of Example 1 was repeated with each of the following polyamides instead of one prepared from dimerized fatty acids, tall oil fatty acid, and diethylene triamine: a polyamide prepared from dimer acids, propionic acid, triethylene tetramine, and ethylene diamine and a polyamide prepared from dimer acids, sebacic acid, tall oil fatty acid, and diethylene triamine. The results were comparable.

EXAMPLE 5

The procedure of Example 1 was repeated except that each of the following solvents was used instead of toluene/Lactol Spirits: toluene, Rotosolve, and Lactol Spirits. The results were comparable.

EXAMPLE 6

For the purpose of comparison a publication gravure printing ink was formulated with 55 parts of unmodified calcium-zinc resinate containing 60% non-volatile material and 45 parts of blue pigment. The product was then cut to print viscosity with toluene/Lactol Spirits, and the blue ink product was used to print insert stock.

The inks made from the products of Examples 1 and 2 were consistently better than the ink of Example 6 in printability of low quality paper stock, e.g., in holdout (non-penetration), gloss, and color development.

The inks made from the products of Examples 1 and 2 also gave much better gloss on coated paper stock than did the product of comparative Example 6.

What is claimed is:

1. A printing ink comprising a polyamide-modified metal resinate, a pigment, and a solvent.

2. The ink of claim 1 wherein the metal resinate is a resinate of calcium, zinc, magnesium, or a mixture of these.

3. A process for the preparation of a polyamide-modified metal resinate which comprises reacting a metal resinate in solution with a polyamide in solution at a temperature within the range of about 25° to 100° C.

4. The process of claim 3 wherein the temperature is within the range of about 70° to 90° C.

5. The process of claim 3 wherein the ratio of amounts is about 1–5 equivalents of the metal resinate to 1 equivalent of the polyamide.

6. The process of claim 3 wherein the ratio of amounts is about 2 equivalents of the metal resinate to about 1 equivalent of the polyamide.

* * * * *